United States Patent
Lin

(10) Patent No.: US 11,138,416 B2
(45) Date of Patent: Oct. 5, 2021

(54) METHOD AND APPARATUS FOR RECOGNIZING AN ORGANISM ACTION, SERVER, AND STORAGE MEDIUM

(71) Applicant: BOE TECHNOLOGY GROUP CO., LTD., Beijing (CN)

(72) Inventor: Hangdong Lin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 141 days.

(21) Appl. No.: 16/540,459

(22) Filed: Aug. 14, 2019

(65) Prior Publication Data

US 2020/0302162 A1    Sep. 24, 2020

(30) Foreign Application Priority Data

Mar. 22, 2019 (CN) .......................... 201910221201.7

(51) Int. Cl.
*G06K 9/00* (2006.01)
*G06K 9/62* (2006.01)

(52) U.S. Cl.
CPC ....... *G06K 9/00342* (2013.01); *G06K 9/6232* (2013.01); *G06K 9/6256* (2013.01)

(58) Field of Classification Search
CPC .......... G06K 9/00342; G06K 9/00369; G06K 9/00771; G06K 9/6232; G06K 9/6256; G06K 9/6273

See application file for complete search history.

(56) References Cited

U.S. PATENT DOCUMENTS

| 2018/0342081 A1* | 11/2018 | Kim .......................... G06T 7/75 |
| 2020/0211154 A1* | 7/2020 | Ng ....................... G06K 9/00718 |
| 2020/0349347 A1* | 11/2020 | Morzhakov ............ G06N 20/00 |

FOREIGN PATENT DOCUMENTS

| CN | 103577836 A | 2/2014 |
| CN | 107644519 A | 1/2018 |
| CN | 107862331 A | 3/2018 |
| CN | 108052896 A | 5/2018 |
| CN | 108985259 A | 12/2018 |
| EP | 3605394 A1 | 2/2020 |
| WO | 2019040213 A1 | 2/2019 |

OTHER PUBLICATIONS

Cao, et al., Realtime Multi-Person 2D Pose Estimation using Part Affinity Fields, The Robotics Institute, Carnegie Mellon University, Pittsburg, PA, CVPR, Apr. 17, 2017.

* cited by examiner

*Primary Examiner* — Bobbak Safaipour
(74) *Attorney, Agent, or Firm* — The Webb Law Firm

(57) ABSTRACT

The present disclosure relates to a method and an apparatus for recognizing an organism action, a server and a storage medium. The method includes: obtaining body feature information of an organism corresponding to time-successive multiple frames of images; creating a feature information sequence, wherein the feature information sequence includes body feature information respectively corresponding to multiple frames of images which are arranged according to a time sequence of the multiple frames of images; and inputting the feature information sequence into a trained recurrent neural network model, and determining an action of the organism corresponding to the feature information sequence according to an output of the recurrent neural network model.

11 Claims, 4 Drawing Sheets

METHOD AND APPARATUS FOR RECOGNIZING AN ORGANISM ACTION, SERVER, AND STORAGE MEDIUM

CROSS-REFERENCE TO RELATED APPLICATIONS

This application is based on and claims priority to Chinese Patent Application No. 201910221201.7, filed on Mar. 22, 2019, which is hereby incorporated by reference in its entirety into the present application.

TECHNICAL FIELD

The present disclosure relates to the field of biometric feature recognition, and in particular, to a method and a apparatus for recognizing an organism action, server, and storage medium.

BACKGROUND

With the development of the pattern recognition technology, people hope that computers can autonomously recognize and understand the daily actions of human to provide services to human through the computers, therefore, human posture and action recognition or the like have become a research hotspot in the existing field of the computer vision. The current action recognition is mainly applied to the fields of human-computer interaction, medical care, intelligent security and protection, and home intelligence, etc.

In some related arts, training labeling is mainly performed on key points of a human body based on a static image and connection labeling is performed on the key points of limbs in human body posture detection. In some other related arts, an acceleration sensor, a gyroscope and other elements are used for data inputting, or speed, distance and other scalars are used for performing analysis to establish a model in human body action detection.

SUMMARY

In one aspect of the present disclosure, a method for recognizing an organism action is provided, including: obtaining body feature information of an organism corresponding to time-successive multiple frames of images; creating a feature information sequence, wherein the feature information sequence includes body feature information respectively corresponding to multiple frames of images which are arranged according to a time sequence of the multiple frames of images; and inputting the feature information sequence into a trained recurrent neural network model, and determining an action of the organism corresponding to the feature information sequence according to the output of the recurrent neural network model.

In some embodiments, the step of obtaining the body feature information includes: obtaining a body column vector of the organism in each frame of image of the multiple frames of images, wherein the body column vector is used for characterizing at least one group of connection relationship between different body parts of the organism in each frame of image of the multiple frames of images.

In some embodiments, the step of obtaining the body column vector includes: obtaining a body vector corresponding to at least one pair of body parts of the organism in the image, wherein the body vector is stored by a unit vector matrix diagram expressed in terms of a two-dimensional confidence diagram; performing statistical processing on the unit vector matrix diagram to determine a connection vector corresponding to the body vector; calculating a deflection angle of connection vector in an image coordinate system relative to a preset coordinate axis according to a starting point position and an end point position of the connection vector; and creating the body column vector of the organism according to the deflection angle corresponding to each body vector.

In some embodiments, the step of obtaining the body vector includes: inputting the image into a trained convolutional neural network model, and determining the body vector according to the convolutional neural network model.

In some embodiments, the method further includes: creating a picture data set of an organism, wherein the picture data set includes at least one of an image of at least one organism, identification information of a body part of the organism in the image, and the identification information of a body vector of at least one pair of body parts of the organism in the image; and inputting the picture data set into an untrained convolutional neural network model for training to obtain a trained convolutional neural network model corresponding to the organism.

In some embodiments, the method further includes: accelerating training of the convolutional neural network model by using a programmable inference acceleration engine.

In some embodiments, the method further includes: creating an action data set of an organism, wherein the action data set includes a feature information sequence corresponding to at least one group of time-successive multiple frames of images of a defined action in at least one preset scene, and the feature information sequence includes body feature information arranged according to the time sequence of the multiple frames of images; and inputting the action data set into an untrained recurrent neural network model for training to obtain a trained recurrent neural network model corresponding to the defined action in the at least one preset scene.

In some embodiments, the method further includes: accelerating training of the recurrent neural network model by using a programmable inference acceleration engine.

In some embodiments, the recurrent neural network model is a bidirectional recurrent neural network model.

In some embodiments, the organism includes a human body.

In one aspect of the present disclosure, an apparatus for recognizing an organism action is provided, including: an information obtaining module, configured to obtain body feature information of an organism corresponding to time-successive multiple frames of images; a sequence creation module, configured to create a feature information sequence, wherein the feature information sequence includes body feature information respectively corresponding to multiple frames of images which are arranged according to a time sequence of the multiple frames of images; and an action determining module, configured to input the feature information sequence into a trained recurrent neural network model, and determine an action of the organism corresponding to the feature information sequence according to an output of the recurrent neural network model.

In some embodiments, the information obtaining module includes: a body vector obtaining unit, configured to obtain a body vector corresponding to at least one pair of body parts of the organism in the image, wherein the body vector is stored by a unit vector matrix diagram expressed in terms of a two-dimensional confidence diagram; an statistical processing unit, configured to perform statistical processing on the unit vector matrix diagram to determine a connection vector corresponding to the body vector; a deflection angle calculation unit, configured to calculate a deflection angle of the connection vector in an image coordinate system relative to a preset coordinate axis according to a starting point position and an end point position of the connection vector; and a column vector creation unit, configured to create a body column vector of the organism according to the deflection angle corresponding to each body vector.

In one aspect of the present disclosure, a server is provided, including: a memory and a processor coupled to the memory, wherein the processor is configured to execute the aforementioned method for recognizing an organism action based on instructions stored in the memory.

In one aspect of the present disclosure, a storage medium is provided, wherein computer instructions are stored thereon, and the computer instructions are executed by a processor to execute the aforementioned method for recognizing an organism action.

BRIEF DESCRIPTION OF THE DRAWINGS

The drawings constituting a part of the description describe the embodiments of the present disclosure, and are used for explaining the principles of the present disclosure together with the description.

The present disclosure can be more clearly understood from the following detailed description with reference to the drawings, wherein.

Figure 1:
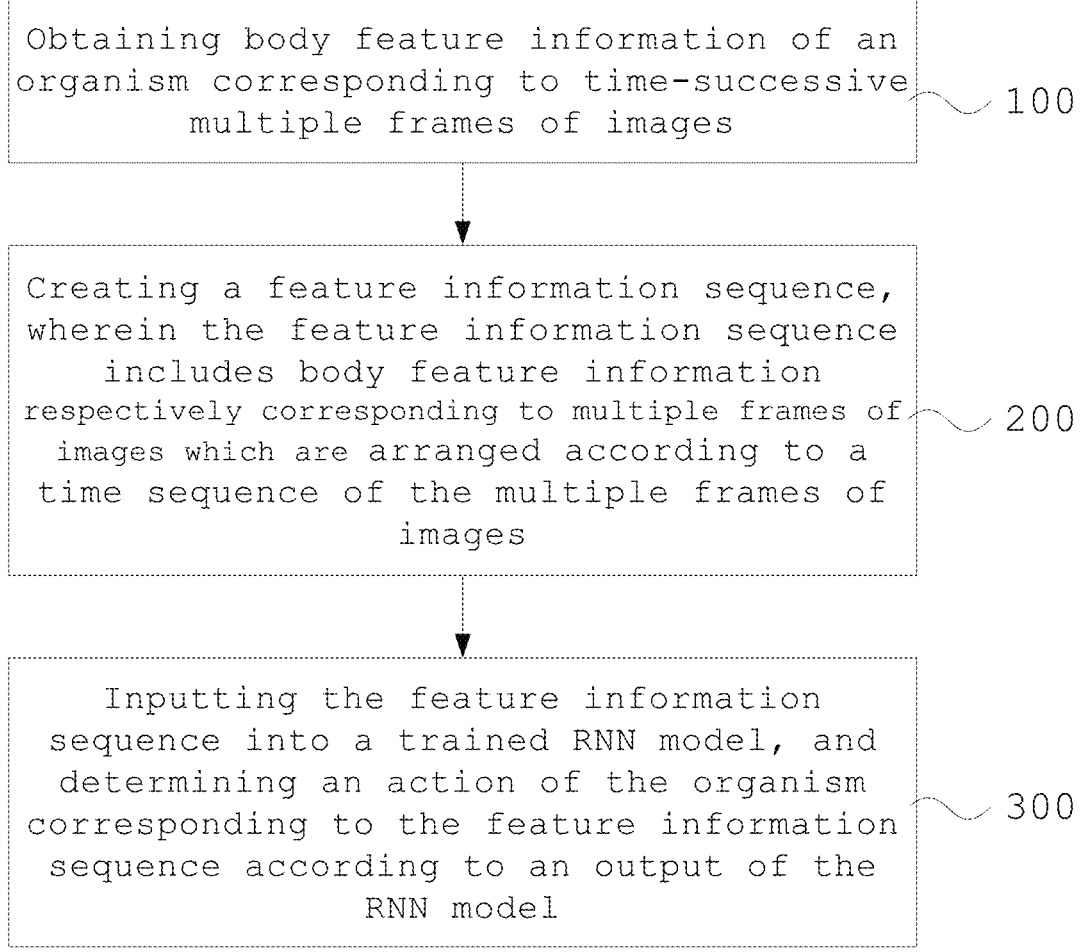
FIG. 1 is a flow schematic diagram of one embodiment of a method for recognizing an organism action according to the present disclosure.

It should be understood that the dimensions of various parts shown in the drawings are not drawn in the actual scale relationship. Further, the same or similar reference signs represent the same or similar members.

DETAILED DESCRIPTION

Various exemplary embodiments of the present disclosure will now be described in detail with reference to the drawings. The description of the exemplary embodiments is merely illustrative, and is in no way used as any limitation to the present disclosure and the application or use thereof. The present disclosure can be implemented in many different forms and is not limited to the embodiments described herein. These embodiments are provided to make the present disclosure thorough and complete and to fully express the scope of the present disclosure to those skilled in the art. It should be noted that, unless otherwise specified, relative arrangement of components and steps, components of materials, numerical expressions and numerical values set forth in these embodiments should be construed as illustrative only instead of limitation.

The words "first", "second" and similar terms used in the present disclosure do not denote any sequence, quantity or importance, but are used for distinguishing different parts. The words "including" or "comprising" and similar terms mean that elements in front of the words include elements listed after the words, and do not exclude the possibility of including other elements. "Upper", "lower", "left", "right" and the like are only used for expressing relative positional relationships, and when an absolute position of a described object is changed, the relative positional relationships may also change accordingly.

In the present disclosure, when it is described that a particular device is located between a first device and a second device, there may be an intervening device between the particular device and the first device or the second device, or there may be no intervening device. When it is described that the particular device is connected with other devices, the particular device can be directly connected with the other devices without the intervening devices, and can also be indirectly connected with the other devices, and the intervening device exists.

All terms (including technical terms or scientific terms) used in the present disclosure have the same meaning as understood by those of ordinary skill in the art to which the present disclosure belongs, unless specifically defined otherwise. It should also be understood that the terms defined in, for example, a general dictionary, should be interpreted as having meanings consistent with their meanings in the context of the related art, but should not be interpreted by ideal or extremely formal meanings, unless explicitly defined herein.

Techniques, methods and devices known to those of ordinary skill in the related art may not be discussed in detail, but the techniques, methods and devices should be considered as a part of the description, where appropriate.

In some related arts, training labeling is mainly performed on key points of a human body based on a static image and connection labeling is performed on the key points of the body in human body posture detection. In some other related arts, an acceleration sensor, a gyroscope and other elements are used for data inputting, or speed, distance and other scalars are used for performing analysis to establish a model in human body action detection.

The inventor has found through researches that only the connection and posture judgment of the key parts of the human body in the static image can be achieved by the human body posture detection in the related art, so that the human body posture detection is difficult to be directly applied to a scene of human body action monitoring, and human body action monitoring needs to rely on the data input of the sensor, which lacks economy and universality, and the model established based on a certain action is difficult to be generalized to other actions, such that the applicability is poor.

In view of this, the embodiments of the present disclosure provide a method for recognizing an organism action and apparatus with better applicability. a server and a storage medium.

FIG. 1 is a flow schematic diagram of one embodiment of a method for recognizing an organism action according to the present disclosure.

Referring to FIG. 1, in some embodiments, the method for recognizing an organism action includes step 100 to step 300. In step 100, body feature information of an organism (or living creature) corresponding to time-successive multiple frames of images is obtained. The time-successive multiple frames of images refer to multiple frames of images having a sequential relationship, time intervals of adjacent frames of images can be the same or different. The multiple frames of images can be from a monitoring video captured by a monitoring facility, for example, the multiple frames of images are taken from a plurality of video frames contained in a segment of monitoring video. Each frame of image generally includes an integral or partial image of at least one organism. In some special cases (for example, the organism leaves the monitoring range for a short time, the monitoring facility does not receive data within a short time due to external influences or the like), the situation that the image of the organism does not exist in some images can also happen. The frame of image without the organism can be deleted during subsequent processing, or, the frame is processed as empty body feature information.

The organism can include a plant body, an animal body or a human body. In view of the recognition requirements of action, the embodiments of the present disclosure mainly recognize the action of the animal body or the human body. The body feature information is symbolized or quantized feature information that characterizes a plurality of body parts of the organism and a connection relationship between the body parts. With the human body as an example, the body parts of the human body can include anatomical body parts, such as the neck, the left shoulder, the right knee, the right ankle or other joints, or the nose, the mouth, the left eye, the right ear and other organs on the head. The body parts can also include custom non-anatomical body parts.

Different body parts can form a specific connection relationship to reflect the head and neck, limbs and trunk and the like of the human body. For example, the features of the head and neck are reflected by the connection relationship between the head and the neck, and the features of the left upper arm are reflected by the connection relationship between the left shoulder and the left elbow, the features of the right thigh are reflected by the connection relationship between the buttocks and the right knee, and the features of the trunk are reflected by the connection relationship from the neck to the buttocks. The connection relationship can also include a connection relationship between the organs on the head, for example, the connection relationship between the left eye and the right eye, the connection relationship between the left ear and the left eye, and the connection relationship between the nose and the mouth, etc.

In step 200, a feature information sequence is created, and the feature information sequence includes body feature information respectively corresponding to multiple frames of images which are arranged according to a time sequence of the multiple frames of images. After the body feature information of the organism corresponding to the frames of images is obtained, the feature information sequence can be created based on the body feature information.

In step 300, the feature information sequence is inputted into a trained recurrent neural network model, and an action of the organism corresponding to the feature information sequence is determined according to the output of the recurrent neural network model. The recurrent neural network (referred to as RNN) model is a neural network model used for training sequence data, prior information can be remembered and the prior information is applied to the calculation of the current output in the training process. In the related art, the RNN is mainly used in the fields of speech recognition, handwriting recognition, machine translation and the like in natural language processing. While in the embodiments of the present disclosure, the RNN model is used for the recognition of the action of the organism in the image, the trained RNN model can correspond to at least one defined action in a particular scene. The input of the RNN model can be obtained by the feature information sequence including the body feature information of the organism, and the output of the RNN model can be used for judging the corresponding action.

The RNN model can be pre-trained as needed to achieve the determination of defined actions (e.g., wave action on a square, a fall action on a road, a climbing action at the outside of a building or the like) in a variety of specific scenes. When the feature information sequence corresponding to a segment of monitoring video is obtained, it can be input into the trained RNN models corresponding to a plurality of actions respectively, and which action of the organism is most possibly contained in the segment of monitoring video is determined according to the outputs of the RNN models. In this way, the monitoring personnel can timely understand the actions of the organism in the video so as to effectively respond to the actions with risk or danger.

In the present embodiments, the feature information sequence is created by obtaining the body feature information of the organism corresponding to the time-successive multiple frames of images, the feature information sequence is input into the trained recurrent neural network model, and the possible action of the organism in the image can be recognized from the multiple frames of images by using the sequence processing capability of the recurrent neural network. Since the body feature information is derived from the analysis of the multiple frames of images, it is not necessary to rely on the data input of various sensors worn by the organism, and thus the economy and versatility are better. Moreover, for actions in different scenes or different types, the recurrent neural network model can be trained to meet the prediction requirements of these actions. The trained recurrent neural network model can be generalized to various actions, and thus makes these embodiments have good adaptability.

The RNN model can be trained for different actions in different scenes to achieve action monitoring. Moreover, the RNN model can be updated according to changes of the scenes and the actions to meet the monitoring requirements of different scenes and different actions, and is not limited to the monitoring of actions in fixed forms. Corresponding, the method for recognizing an organism action of the present disclosure can bring a wide scene application range, for example, monitoring personnel safety conditions in fire protection, monitoring patient activities in hospitals, monitoring fights in schools and other scenes, and can be applicable to the prediction of any type of actions.

In some embodiments, the method for recognizing an organism action can further include a training process of the RNN model. Before the RNN model is trained, an action data set of the organism can be created at first. The action data set includes a feature information sequence corresponding to at least one group of time-successive multiple frames of images of a defined actions in at least one preset scene. The feature information sequence includes body feature information of the organism corresponding to the multiple frames of images arranged in a time sequence of the multiple frames of images. Then, the action data set is inputted into an untrained RNN model for training to obtain a trained RNN model corresponding to the defined action in the at least one preset scene. The inference acceleration can be performed by a programmable inference acceleration engine (such as TensorRT proposed by NVIDIA) during the training of the RNN model.

Figure 2:
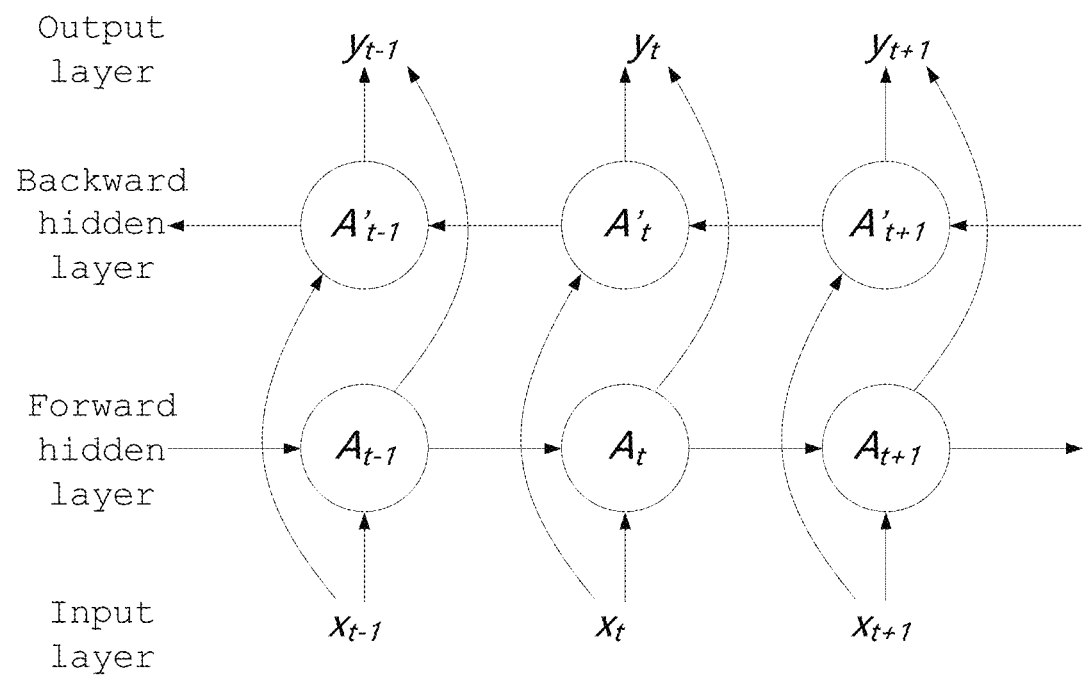
FIG. 2 is a schematic diagram of a bidirectional recurrent neural network model used in one embodiment of the method for recognizing an organism action according to the present disclosure.
Figure 3:
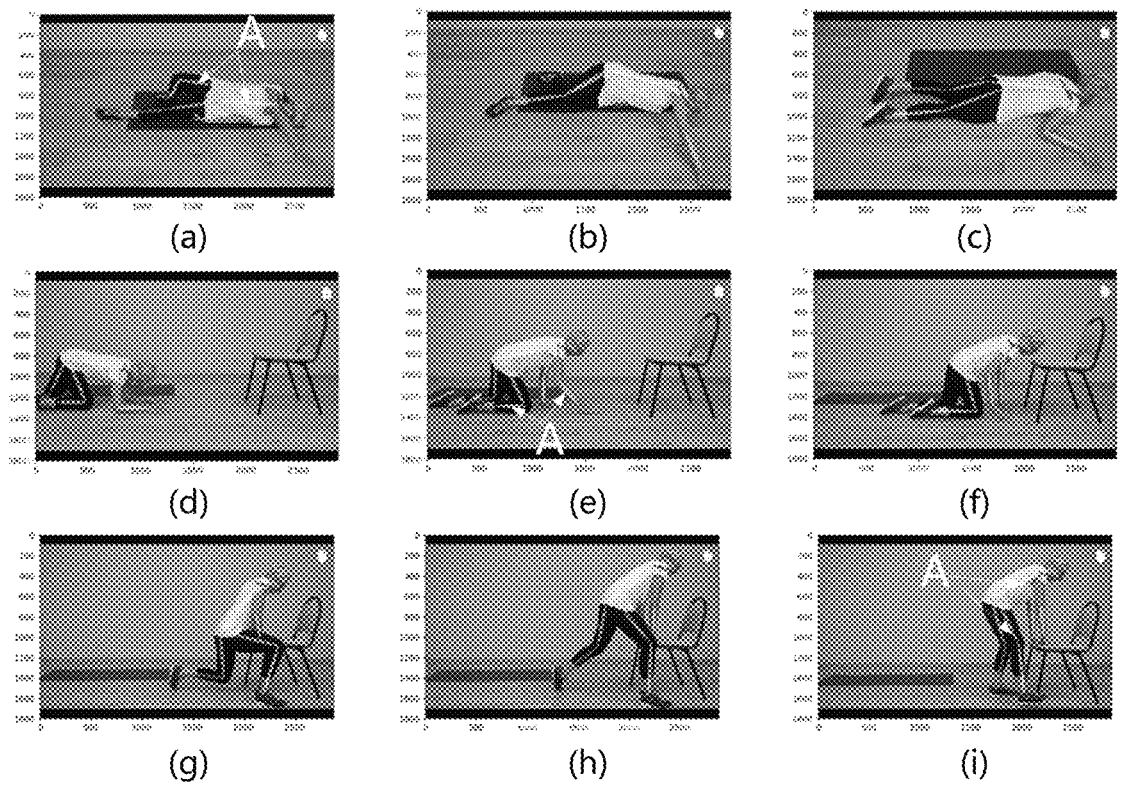
FIG. 3 is a schematic diagram of identifying preferable connection vectors in multiple frames of images by lines in one embodiment of the method for recognizing an organism action according to the present disclosure.

FIG. 2 is a schematic diagram of a bidirectional recurrent neural network model used in one embodiment of the method for recognizing an organism action according to the present disclosure. FIG. 3 is a schematic diagram of identifying preferable connection vectors in multiple frames of images by line in one embodiment of the method for recognizing an organism action according to the present disclosure.

In a monitoring video screen, the actions of the organism are usually coherent. The posture embodied by the action in each time segment is related to both the posture in the previous time segment and the posture in the next time segment. In order to improve the accuracy of model prediction, referring to FIG. 2, in some embodiments, the RNN model can adopt a bidirectional recurrent neural network model (referred to as Bi-RNN). Each training sequence of the recurrent neural network model corresponds to two RNNs forward and backward respectively, and the two RNNs are both connected to an output layer. The Bi-RNN model can simultaneously use the historical data and future data input in the feature information sequence, so that each moment in the feature information sequence can be predicted based on the context.

In FIG. 2, in the feature information sequence serving as an input layer of the Bi-RNN model, t represents a time step corresponding to each frame of image. In other words, $x_t$ in the feature information sequence represents the body feature information corresponding to the current frame of image, and $x_{t-1}$ and $x_{t+1}$ represent the body feature information corresponding to the previous frame of image and the subsequent frame of image, respectively. The output $y_t$, $y_{t-1}$ and $y_{t+1}$ can be classification probabilities of the actions corresponding to the current frame of image, the previous frame of image and the subsequent frame of image, respectively. Two hidden layers are arranged between the input layer and the output layer, which are respectively called a forward hidden layer and a backward hidden layer according to the calculation direction. In the calculation of numerical values of nodes in the forward hidden layer, the following formula can be used:

$$A_t = f(WA_{t-1} + Ux_t);$$

In the calculation of the numerical values of the nodes in the backward hidden layer, the following formula can be used:

$$A'_t = f(W'A'_{t+1} + U'x_t);$$

According to the numerical values of the nodes in the forward hidden layer and the backward hidden layer corresponding to each time step respectively, the output of each time step can be calculated, that is, the following formula:

$$y_t = g(VA_t + V'A'_t).$$

$f( )$ represents an activation function of the forward hidden layer and the backward hidden layer, and $g( )$ represents the activation function of the output layer. W、W'、U、U'、V、V' respectively represent different weight matrices. The activation function can adopt one of several commonly used activation functions, such as Sigmoid nonlinear function, Tan h nonlinear function, ReLU nonlinear function, and the like. By inputting a data set for training into the Bi-RNN model, the weight matrices can be adjusted to optimize the prediction performance of the Bi-RNN. In some other embodiments, an ordinary RNN model or other RNN optimization models can also be adopted.

Taking nine frames of images shown in FIGS. 3(a) to 3(i) as an example, these images represent the rising action of a person in an indoor environment in the figures. In addition to the background and the human image in the frames of images in FIG. 3, connection vectors corresponding to body vectors are also identified by lines (referring to the lines pointed by a white arrow A in the figure). The nine frames of images can be used for creating the action data set of the organism for training of the RNN model. In other embodiments, the creation of the feature information sequence and the training of the RNN model for the rising action can also be performed on an image including a plurality of organisms. The plurality of organisms can be monitored simultaneously and independently.

Figures 4, 5:
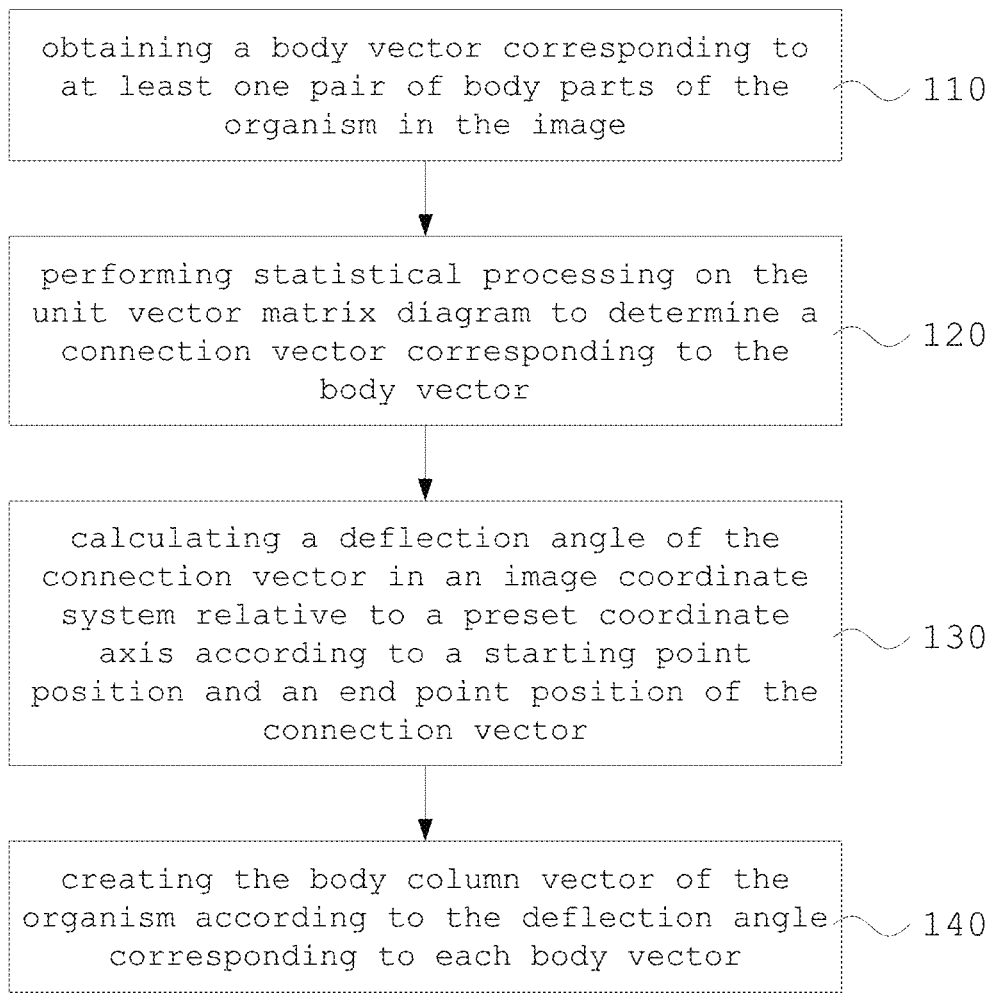
FIG. 4 is a flow schematic diagram of obtaining body feature information in one embodiment of the method for recognizing an organism action according to the present disclosure.
FIG. 5 is a two-dimensional confidence diagram for storing body vectors output by a convolutional neural network model in one embodiment of the method for recognizing an organism action according to the present disclosure.

FIG. 4 is a flow schematic diagram of obtaining body feature information in one embodiment of the method for recognizing an organism action according to the present disclosure. FIG. 5 is a two-dimensional confidence diagram for storing body vectors output by a convolutional neural network model in one embodiment of the method for recognizing an organism action according to the present disclosure.

Referring to FIG. 4, in some embodiments, the step of obtaining the body feature information in step 100 can include: obtaining a body column vector of the organism in each frame of image of the multiple frames of images, wherein the body column vector is used for characterizing at least one group of connection relationship between different body parts of the organism in the images. In this way, the time-successive multiple frames of images can be represented as a feature information sequence of body column vectors including a plurality of time steps.

In FIG. 4, the process of obtaining the body column vector can include step 110 to step 140. In step 110, a body vector corresponding to at least one pair of body parts of the organism in the image are obtained. Specifically, the image can be input into a trained convolutional neural network (referred to as CNN) model, and the body vector of each pair of body parts of the organism can be obtained according to an output of the CNN model. The body vector can be stored by using a unit vector matrix diagram expressed in terms of a two-dimensional confidence diagram as shown in FIG. 5.

In FIG. 5, N represents the number of body vectors. The two-dimensional confidence diagram of each body vector includes two-dimensional vectors corresponding to respective image units (for example, one or more pixels) divided in the image, for example, (0.5, 0.86), (0.7, 0.7), (0, 1), . . . . The two-dimensional vector can represent the probability that a certain image unit belongs to a certain body vector. For example, the first dimensional data in the two-dimensional vector represents the probability that each image unit in the image belongs to the first body part, and the second dimensional data represents the probability that each image unit in the image belongs to the second body part.

The training of the CNN model can be obtained by training a picture data set of the organism containing identification information. That is, the picture data set of the organism is created at first. The picture data set includes at least one of an image of at least one organism, identification information of a body part of the organism in the image, and the identification information of a body part vector of at least one pair of body parts of the organism in the image. The identification information of the body part can include a coordinate value of the body part in the image, and a one-dimensional confidence diagram corresponding to the body part in the image can be obtained according to the coordinate value. In other embodiments, the identification information of the body part may directly include a one-dimensional confidence diagram corresponding to the body part.

The identification information can be stored independent of the image and can also be stored in the image data. The body part can be defined by a trainer, for example, defining multiple body parts of a person such as the top of the head, the left ear, the right ear, the right eye, the left eye, the nose, the mouth, the neck, the left shoulder, the right shoulder, the left elbow, the right elbow, the left wrist, the right wrist, the buttocks, the left knee, the right knee, the left ankle, the right ankle, etc.

In addition, the identification information can also include a starting point coordinate and an end point coordinate of the body vector between the body parts. The two-dimensional confidence diagram or the like of the unit body vector in the image can be obtained according to the starting point coordinate and the end point coordinate. In other embodiments, the identification information of the body vector may directly include a two-dimensional confidence diagram corresponding to the body vector.

The body vector can be further defined by the trainer based on the defined body parts, for example, the body vector from the left shoulder to the left elbow, the body vector from the hip to the right knee and the like. Then, the above picture data set can be inputted into an untrained CNN model for training to obtain a trained CNN model corresponding to the organism. In the training process, the confidence diagram of the body part and the two-dimensional confidence diagram of the body vector can be defined by using Gaussian peak values and can be reasoned and accelerated by a programmable inference acceleration engine (for example, TensorRT proposed by NVIDIA). In other embodiments, the data set used in the training of the CNN model can also include data provided by various sensors worn by the organism.

In step 120, statistical processing is performed on the obtained unit vector matrix diagram, and an optimal connection mode in the statistical result is determined as a connection vector corresponding to the body vector. The statistical processing of the unit vector matrix diagram can adopt existing statistical functions such as arithmetic average, weighted average or root mean square. For example, during the calculation, the root mean square of the two-dimensional data corresponding to each image unit may be separately calculated for a certain body vector, and multiple image units which calculation exceed a set threshold and may be sequentially connected into a line segment are determined. If multiple line segments are determined, sum or variance of the two-dimensional data corresponding to multiple image units in each line segment may be compared to determine the optimal connection mode.

In step 130, when the connection vector corresponding to the body vector is obtained, a deflection angle of the connection vector in an image coordinate system (that is, a pre-defined rectangular coordinate system in two-dimensional image) relative to a preset coordinate axis (for example, an x axis in the rectangular coordinate system) according to a starting point position and an end point position of the connection vector. During the calculation, the deflection angle can be obtained by trigonometric function calculation, for example, $\theta=\arctan((y_e-y_s)/(x_e-x_s))$, where $\theta$ represents the deflection angle, and $x_s$ and $y_s$ represent x axis coordinate and y axis coordinate of the starting point position of the connection vector, respectively, and $x_e$ and $y_e$ represent the x axis coordinate and y axis coordinate of the end point position of the connection vector, respectively.

In step 140, the body column vector of the organism is created according to the deflection angle corresponding to each body vector. Through the foregoing steps 120 and 130, the deflection angle of the connection vector corresponding to the body vector in the image coordinate system can be calculated, and the deflection angle is the deflection angle corresponding to the body vector. For multiple body vectors, these body vectors can be converted into corresponding multiple deflection angles. For example, multiple groups of body vectors, for example, the left shoulder to the left elbow, the buttocks to the right knee of the person are converted into the deflection angles $\theta_1, \theta_2, \ldots, \theta_N$ corresponding to the left shoulder to the left elbow, the buttocks to the right knee and the like of the person, N represents the number of body vectors, and the v, $v^T=(\theta_1, \theta_2, \ldots, \theta_N)$ is obtained by conversion.

One organism in one image can create one group of corresponding body column vectors, so that the feature information sequence composed of the body column vectors of the organism corresponding to the time-successive multiple frames of images can be further obtained. The feature information sequence including nine body column vectors can be obtained by the nine frames of images in FIG. 3(a) to FIG. 3(i), and is used for the training the RNN model of the indoor rising action of the person.

Figure 6:
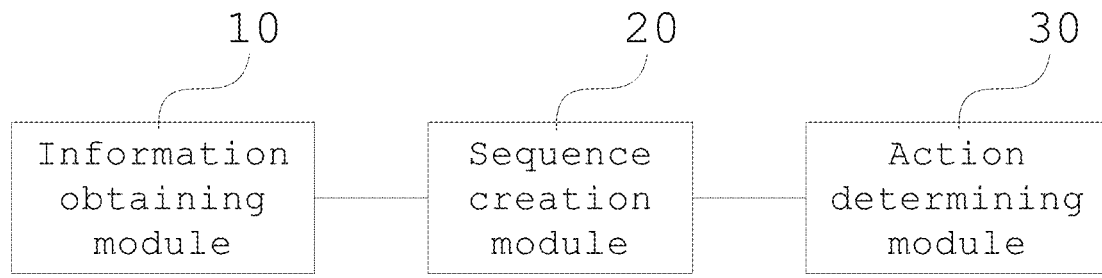
FIG. 6 is a box schematic diagram of one embodiment of an apparatus for recognizing an organism action according to the present disclosure.

FIG. 6 is a box schematic diagram of one embodiment of an apparatus for recognizing an organism action according to the present disclosure.

Referring to FIG. 6, in some embodiments, the apparatus for recognizing an organism action includes: an information obtaining module 10, a sequence creation module 20 and an action determining module 30. The information obtaining module 10 is configured to obtain body feature information of an organism corresponding to time-successive multiple frames of images. The feature information sequence can be at least one body column vector of each organism involved in each frame of image of the multiple frames of image. The body column vector is used for characterizing a connection relationship between body parts of the organism in the image.

The sequence creation module 20 is configured to create a feature information sequence, and the feature information sequence includes body feature information respectively corresponding to multiple frames of images which are arranged according to a time sequence of the multiple frames of images. The action determining module 30 is configured to input the feature information sequence into a trained recurrent neural network model, and determine an action of the organism corresponding to the feature information sequence according to the output of the recurrent neural network model.

In the present embodiment, the feature information sequence is created by obtaining the body feature information of the organism corresponding to the time-successive multiple frames of images, the feature information sequence is inputted into the trained recurrent neural network model, and the possible action of the organism in the image can be recognized from the multiple frames of images by using the sequence processing capability of the recurrent neural network. Since the body feature information is derived from the analysis of the multiple frames of images, it is not necessary to rely on the data input of various sensors worn by the organism, and thus the economy and versatility are better. Moreover, for actions in different scenes or different types, the recurrent neural network model can be trained to meet the prediction requirements of these actions. The trained recurrent neural network model can be generalized to various actions, and thus has good adaptability.

Figure 7:
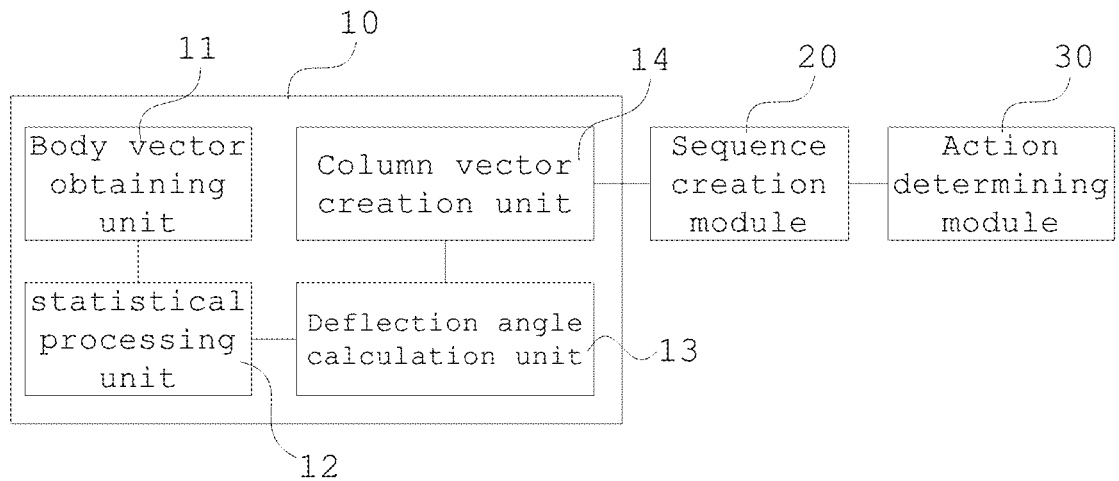
FIG. 7 is a box schematic diagram of another embodiment of an apparatus for recognizing an organism action according to the present disclosure.

FIG. 7 is a box schematic diagram of another embodiment of an apparatus for recognizing an organism action according to the present disclosure.

Referring to FIG. 7, in some embodiments, the information obtaining module 10 can include a body vector obtaining unit 11, statistical processing unit 12, a deflection angle calculation unit 13 and a column vector creation unit 14. The body vector obtaining unit 11 obtains a body vector corresponding to at least one pair of body parts of the organism in the image, and the body vector is stored by a unit vector matrix diagram expressed in terms of a two-dimensional confidence diagram. The body vector obtaining unit 11 can input the image into a trained convolutional neural network model and determine the body vector according to the output of the convolutional neural network model. The statistical processing unit 12 is configured to perform statistical processing on the unit vector matrix diagram to determine a connection vector corresponding to the body vector.

The deflection angle calculation unit 13 configured to calculate a deflection angle of the connection vector in an image coordinate system relative to a preset coordinate axis according to a starting point position and an end point position of the connection vector. The column vector creation unit 14 is configured to create a body column vector of the organism according to the deflection angle corresponding to each body vector.

In some embodiments, the apparatus for recognizing an organism action can also include other modules, configured to create a picture data set of the organism, and input the picture data set into an untrained convolutional neural network model for training to obtain a trained convolutional neural network model corresponding to the organism. The picture data set includes at least one of an image of at least one organism, identification information of a body part of the organism in the image, and the identification information of a body vector of at least one pair of body parts of the organism in the image. The module can also adopt a programmable inference acceleration engine to accelerate the training of the convolutional neural network model while training the convolutional neural network model.

In some embodiments, the apparatus for recognizing an organism action can also include other modules, configured to create an action data set of the organism, and input the action data set into an untrained recurrent neural network model for training to obtain a trained recurrent neural network model corresponding to the defined action in the at least one preset scene. The action data set includes a feature information sequence corresponding to at least one group of time-successive multiple frames of images of a defined actions in at least one preset scene, and the feature information sequence includes body feature information arranged according to the time sequence of the multiple frames of images. The module can also adopt a programmable inference acceleration engine to accelerate the training of the recurrent neural network model while training the recurrent neural network model. In addition, the recurrent neural network model can be a bidirectional recurrent neural network model.

Figure 8:
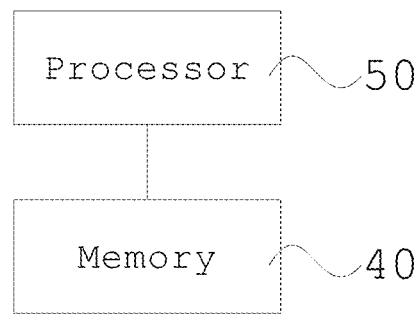
FIG. 8 is a box schematic diagram of one embodiment of a server according to the present disclosure.

FIG. 8 is a box schematic diagram of one embodiment of a server according to the present disclosure.

Referring to FIG. 8, in some embodiments, the server includes: a memory 40 and a processor 50 coupled to the memory, the processor 50 is configured to execute the aforementioned method for recognizing an organism action based on instructions stored in the memory 40. In some embodiments of the present disclosure, a storage medium is further provided, computer instructions are stored thereon, wherein the computer instructions are executed by a processor to execute the aforementioned method for recognizing an organism action. The storage medium can include, for example, a system memory, a fixed non-volatile storage medium, or the like. The system memory stores, for example, an operating system, an application program, a boot loader, and other programs.

Those skilled in the art should understand that the embodiment of the method of the present disclosure can be provided as a method, a system or a computer program product. Accordingly, the present disclosure can take the form of a complete hardware embodiment, a complete software embodiment, or an embodiment combining software and hardware aspects. Moreover, the present disclosure can take the form of a computer program product embodied on one or more computer-usable non-transitory storage media (including, but not limited to, a disk memory, a CD-ROM, an optical memory or the like) containing computer usable program codes.

The present disclosure is described with reference to the flow diagrams and/or block diagrams of the method, device (system) and the computer program product in the embodiments of the present invention. It should be understood that computer program instructions can achieve each flow and/or block in the flow diagrams and/or block diagrams and the combination of the flows and/or blocks in the flow diagrams and/or block diagrams. These computer program instructions can be provided to a general-purpose computer, a special-purpose computer, an embedded processor or processors of other programmable data processing devices to generate a machine, such that the instructions executed by computers or the processors of other programmable data processing devices generate apparatuses used for achieving specified functions in one or more flows in the flow diagrams and/or one or more blocks in the block diagrams.

These computer program instructions can also be stored on computer readable memories that are capable of guiding the computers or the other programmable data processing devices to work in a specific manner, so that the instructions stored in the computer readable memories generate a product including an instruction apparatus, and the instruction apparatus implements specified functions in one or more flows in the flow diagrams and/or one or more blocks in the block diagrams.

These computer program instructions can also be loaded onto the computers or the other programmable data processing devices, so that a series of operation steps are executed on the computers or the other programmable devices to generate the processing implemented by the computers, therefore the instructions executed on the computers or the other programmable devices provide steps for implementing the specified functions in one or more flows in the flow diagrams and/or one or more blocks in the block diagrams.

A plurality of embodiments in the description are described in a progressive manner, the key point of the embodiments are different, and the identical or similar parts between the embodiments refer to each other. For the apparatus embodiment, it entirety and the involved steps have a corresponding relationship with the contents in the method embodiment, thus is described simply, and related parts can refer to a part of illustration in the method embodiment.

So far, various embodiments of the present disclosure have been described in detail. In order to avoid obscuring the concepts of the present disclosure, some details known in the art are not described. Those skilled in the art can fully understand how to implement the technical solutions disclosed herein according to the above description.

Although some specific embodiments of the present disclosure have been described in detail by way of example, those skilled in the art should understand that the above embodiments are merely used for illustrating, rather than limiting the scope of the present disclosure. Those skilled in the art should understand that modifications or equivalent substitutions to a part of technical features can be made to the above embodiments without departing from the scope and spirit of the present disclosure. The scope of the present disclosure is defined by the appended claims.

What is claimed is:

1. A method for recognizing an organism action, comprising:
   obtaining body feature information of an organism corresponding to time-successive multiple frames of images;
   creating a feature information sequence, wherein the feature information sequence comprises body feature information respectively corresponding to multiple frames of images which are arranged according to a time sequence of the multiple frames of images; and
   inputting the feature information sequence into a trained recurrent neural network model, and determining an action of the organism corresponding to the feature information sequence according to an output of the trained recurrent neural network model,
   wherein obtaining the body feature information comprises: obtaining a body column vector of the organism in each frame of image of the multiple frames of images, wherein the body column vector is used for characterizing at least one group of connection relationship between different body parts of the organism in each frame of image of the multiple frames of images,
   wherein obtaining the body column vector comprises:
   obtaining a body vector corresponding to at least one pair of body parts of the organism in the image, wherein the body vector is stored by a unit vector matrix diagram expressed in terms of a two-dimensional confidence diagram;
   performing statistical processing on the unit vector matrix diagram to determine a connection vector corresponding to the body vector;
   calculating a deflection angle of the connection vector in an image coordinate system relative to a preset coordinate axis according to a starting point position and an end point position of the connection vector; and
   creating the body column vector of the organism according to the deflection angle corresponding to each body vector.

2. The method according to claim 1, wherein obtaining the body vector comprises:
   inputting the image into a trained convolutional neural network model, and determining the body vector according to the trained convolutional neural network model.

3. The method according to claim 2, further comprising:
   creating a picture data set of an organism, wherein the picture data set comprises at least one of an image of at least one organism, identification information of a body part of the organism in the image, and identification information of a body vector of at least one pair of body parts of the organism in the image; and
   inputting the picture data set into an untrained convolutional neural network model for training to obtain a trained convolutional neural network model corresponding to the organism.

4. The method according to claim 3, further comprising:
   accelerating training of the trained convolutional neural network model by using a programmable inference acceleration engine.

5. The method according to claim 1, further comprising:
   creating an action data set of an organism, wherein the action data set comprises a feature information sequence corresponding to at least one group of time-successive multiple frames of images of a defined action in at least one preset scene, and the feature information sequence comprises body feature information arranged according to the time sequence of the multiple frames of images; and
   inputting the action data set into an untrained recurrent neural network model for training to obtain a trained recurrent neural network model corresponding to the defined action in the at least one preset scene.

6. The method according to claim 5, further comprising:
   accelerating training of the untrained recurrent neural network model by using a programmable inference acceleration engine.

7. The method according to claim 1, wherein the untrained recurrent neural network model is a bidirectional recurrent neural network model.

8. The method according to claim 1, wherein the organism comprises a human body.

9. A server, comprising: a memory and a processor coupled to the memory, wherein the processor is configured to execute the method for recognizing an organism action according to claim 1 based on instructions stored in the memory.

10. A non-transitory storage medium, wherein computer instructions are stored thereon, and the computer instructions are executed by a processor to execute the method for recognizing an organism action according to claim 1.

11. An apparatus for recognizing an organism action, comprising:
    an information obtaining processor, configured to obtain body feature information of an organism corresponding to time-successive multiple frames of images;
    a sequence creation processor, configured to create a feature information sequence, wherein the feature information sequence comprises body feature information respectively corresponding to multiple frames of images which are arranged according to a time sequence of the multiple frames of images; and
    an action determining processor, configured to input the feature information sequence into a trained recurrent neural network model, and determine an action of the organism corresponding to the feature information sequence according to an output of the recurrent neural network model, wherein the information obtaining processor comprises:
a body vector obtaining unit, configured to obtain a body vector corresponding to at least one pair of body parts of the organism in the image, wherein the body vector is stored by a unit vector matrix diagram expressed in terms of a two-dimensional confidence diagram;
a statistical processing unit, configured to perform statistical processing on the unit vector matrix diagram to determine a connection vector corresponding to the body vector;
a deflection angle calculation unit, configured to calculate a deflection angle of the connection vector in an image coordinate system relative to a preset coordinate axis according to a starting point position and an end point position of the connection vector; and
a column vector creation unit, configured to create a body column vector of the organism according to the deflection angle corresponding to each body vector.

* * * * *